US010766203B2

(12) United States Patent
Civolani et al.

(10) Patent No.: US 10,766,203 B2
(45) Date of Patent: Sep. 8, 2020

(54) THERMAL BONDING ASSEMBLY

(71) Applicant: ILAPAK ITALIA S.P.A., Foiano Della Chiana (IT)

(72) Inventors: Daniele Civolani, Molinella (IT); Francesco Marchioni, Bologna (IT)

(73) Assignee: ILAPAK ITALIA S.P.A., Foiano Della Chiana (IT)

( * ) Notice: Subject to any disclaimer, the term of this patent is extended or adjusted under 35 U.S.C. 154(b) by 0 days.

(21) Appl. No.: 16/348,055

(22) PCT Filed: Nov. 3, 2017

(86) PCT No.: PCT/EP2017/078229
§ 371 (c)(1),
(2) Date: May 7, 2019

(87) PCT Pub. No.: WO2018/087010
PCT Pub. Date: May 17, 2018

(65) Prior Publication Data
US 2019/0337237 A1    Nov. 7, 2019

(30) Foreign Application Priority Data

Nov. 8, 2016  (IT) .................... 102016000112020

(51) Int. Cl.
*B32B 37/00* (2006.01)
*B29C 65/18* (2006.01)
*B29C 65/00* (2006.01)

(52) U.S. Cl.
CPC ............. *B29C 65/18* (2013.01); *B29C 66/43* (2013.01); *B29C 66/8145* (2013.01);
(Continued)

(58) Field of Classification Search
USPC ........................................ 156/580
See application file for complete search history.

(56) References Cited

U.S. PATENT DOCUMENTS 3,740,300 A * 6/1973 Heinzer et al. ......... B29C 65/18
156/530
4,134,245 A   1/1979 Stella
4,611,455 A * 9/1986 Aiuola .................... B29C 65/18
156/583.1

FOREIGN PATENT DOCUMENTS

EP    0686479 A2    12/1995

OTHER PUBLICATIONS

International Search Report dated Jan. 23, 2018 re: Application No. PCT/EP2017/078229, pp. 1-3, citing: EP 0 686 479 A2 and U.S. Pat. No. 4,134,245 A.
(Continued)

*Primary Examiner* — James D Sells
(74) *Attorney, Agent, or Firm* — Cantor Colburn LLP

(57) ABSTRACT

A thermal bonding assembly for sheets made of polymeric material includes at least one pair of jaws that can be moved mutually closer, at least one of which is provided with a heater at its surface for abutment against a corresponding complementary surface of the other jaw of the pair. The assembly includes a shaft that can rotate by virtue of the action of a respective motor. The rotatable shaft includes at least two eccentric rings which are arranged side by side so that the eccentric portion that protrudes the most with respect to the rotation axis is substantially mutually opposite. Each jaw of the pair includes a respective through hole for the accommodation of the shaft. The shaft is accommodated in the hole of a respective jaw with the interposition of a rotatable disk.

9 Claims, 4 Drawing Sheets

(52) U.S. Cl.
CPC .. *B29C 66/82265* (2013.01); *B29C 66/83221* (2013.01); *B29C 66/849* (2013.01)

(56) References Cited

OTHER PUBLICATIONS

IT Search Report dated Jul. 24, 2017 re: Application No. 2016000112020, pp. 1-7, citing: EP 0 686 479 A2 and U.S. Pat. No. 4,134,245 A.
Written Opinion dated Jan. 23, 2018 re: Application No. PCT/EP2017/078229, pp. 1-5, citing: EP 0 686 479 A2 and U.S. Pat. No. 4,134,245 A.

* cited by examiner

THERMAL BONDING ASSEMBLY

TECHNICAL FIELD

The present disclosure relates to a thermal bonding assembly for lines for packaging pouches and/or blanks made of polymeric film or of any other laminar material of the type normally used for packaging.

BACKGROUND

The production of polymeric film pouches, as well as the production of any other type of blank that provides for the thermal bonding of juxtaposed film flaps, is an extremely delicate industrial step.

A first problem that is observed is linked to the need to perform precise thermal bondings, which are both strong and capable of ensuring optimum tightness (for example tightness to liquids for any pouch being provided) regardless of the thickness of the polymeric film being processed.

Likewise, the need to perform the thermal bonding of superimposed flaps (for example layerings of multiple sheets superimposed at folds of the blank being provided, as occurs for example in the type of pouch known as "doypack") increases the complexity of the thermal bonding operations, since it renders the thickness of the material on which the thermal bonding heads work uneven.

These requirements entail the use of thermal bonding assemblies that are capable of generating very high compression forces on the film.

The application of a very high pressure to the film by means of the thermal bonding heads requires the adoption of very rigid and consequently heavy thermal bonding assemblies.

Thermal bonding assemblies with such characteristics are preferably of the static type, differently from the film, which reaches them with a stepwise advancement motion.

A further requirement that can be observed universally in all machines for the packaging of pouches and/or of blanks made of polymeric film is that the thermal bonding assemblies, which are normally present in multiple quantities in order to perform different thermal bonding operations and/or to repeat thermal bonding operations that have already been performed, can be repositioned easily in order to adapt to the dimensional variations caused by pouches and/or by blanks of different shape and size.

These results are currently obtained by adopting thermal bonding assemblies that are supported by footings having a large mass (and consequent space occupation) in order to provide the support and the rigidity that are adequate for the intense forces generated during thermal bonding.

It is further preferable that the movement for relative approach of the thermal bonding heads toward the film to be subjected to thermal bonding be of the translational type instead of rotary, since this ensures a better distribution of the pressure on the area on which they will abut, regardless of the shape and dimensions of the latter.

SUMMARY

The aim of the present disclosure is to solve the problems described above, by proposing a thermal bonding assembly that is capable of applying intense pressures despite being substantially modest in dimensions and mass.

Within this aim, the disclosure provides a thermal bonding assembly that does not require specific heavy and bulky support footings.

Another feature of the disclosure is to provide a thermal bonding assembly that is capable of applying high uniform pressures to the entire area to be subjected to thermal bonding regardless of the method of application of motion to the mutually approaching thermal bonding heads.

The present disclosure further provides a thermal bonding assembly that has modest costs, is relatively simple to provide in practice and is safe in application.

This aim and these and other advantages which will become better apparent hereinafter are achieved by providing a thermal bonding assembly for sheets made of polymeric material, of the type comprising at least one pair of jaws that can be moved mutually closer, at least one of which is provided with a heater at its surface for abutment against a corresponding complementary surface of the other jaw of the pair, characterized in that it comprises a shaft that can rotate by virtue of the action of a respective motor, said shaft comprising at least two eccentric rings which are arranged side by side so that the eccentric portion that protrudes the most with respect to the rotation axis is substantially mutually opposite, each jaw of said pair comprising a respective through hole for the accommodation of said shaft, with the interposition of a rotatable disk, the hole of a first jaw accommodating rotatably a first disk, said first disk being provided with an eccentric hole the shape and dimensions of which are complementary to those of a respective eccentric ring that is integral with said shaft and the hole of a second jaw accommodating rotatably a second disk, said second disk being provided with an eccentric hole the shape and dimensions of which are complementary to those of a respective eccentric ring that is integral with said shaft, the rotation of said shaft causing a mutual approach/spacing motion of said abutment surfaces of said jaws by virtue of the action of said eccentric rings in the corresponding disk that can rotate in said hole of a respective jaw.

BRIEF DESCRIPTION OF THE DRAWINGS

Further characteristics and advantages of the disclosure will become better apparent from the description of a preferred but not exclusive embodiment of the thermal bonding assembly according to the disclosure, illustrated by way of nonlimiting example in the accompanying drawings, wherein.

DETAILED DESCRIPTION OF THE DRAWINGS

Figure 1:
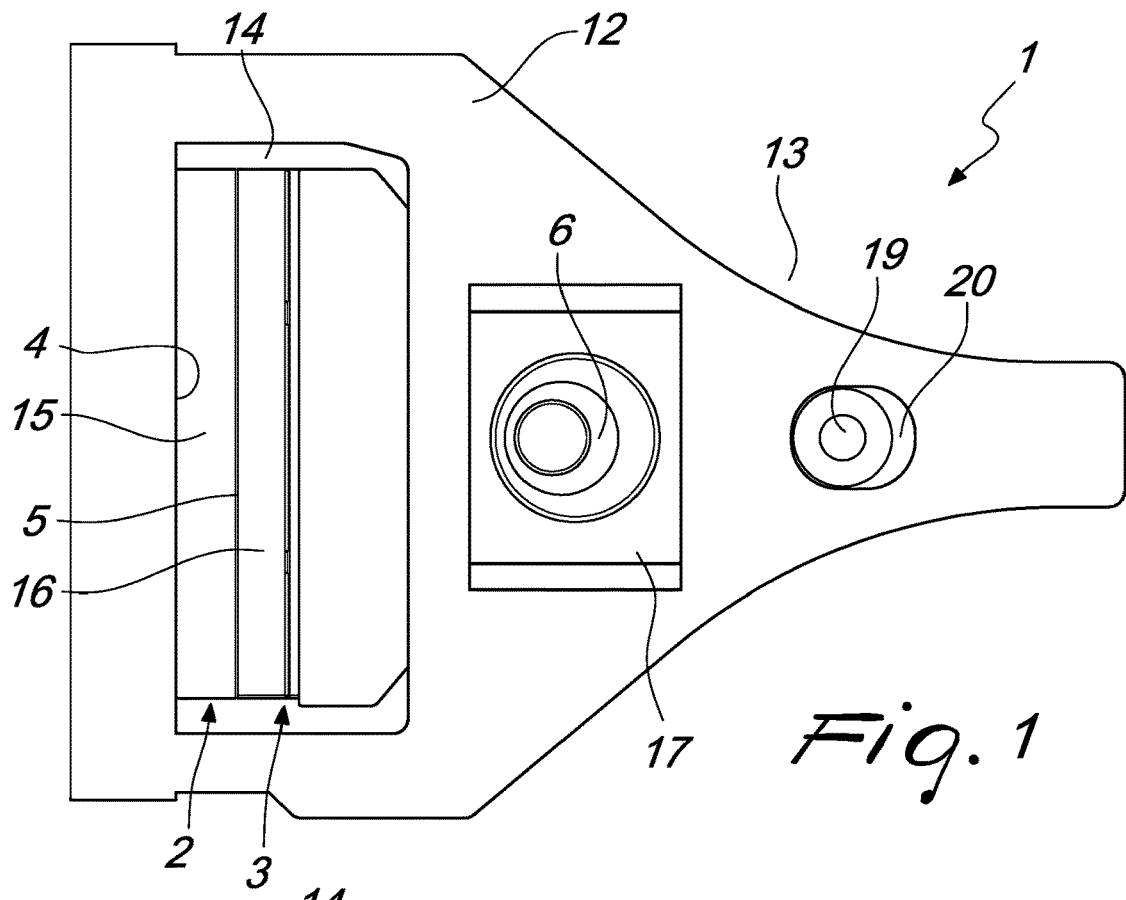
FIG. 1 is a schematic front view of a thermal bonding assembly according to the disclosure in a first configuration with the jaws closed.
Figure 2:
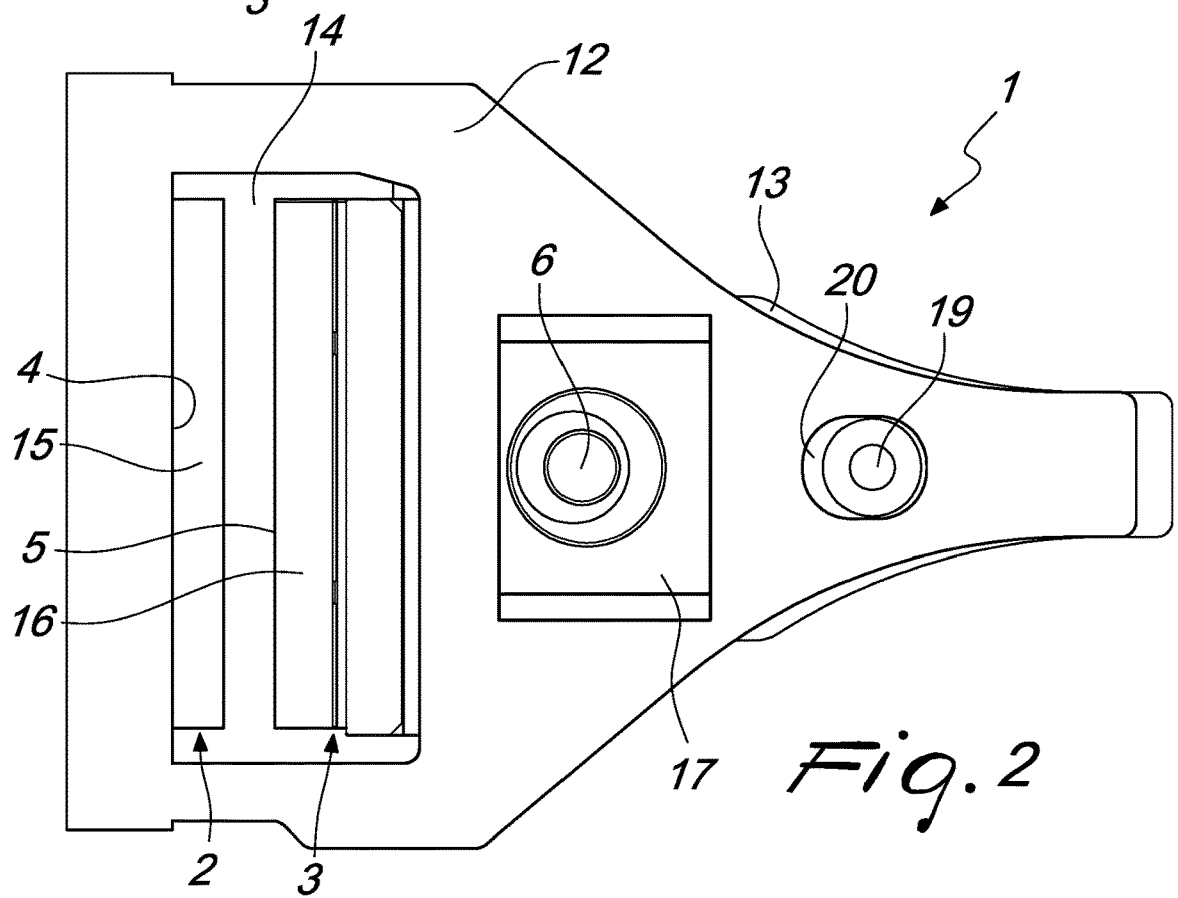
FIG. 2 is a schematic front view of the thermal bonding assembly of FIG. 1 in a second configuration with the jaws open.
Figure 3:
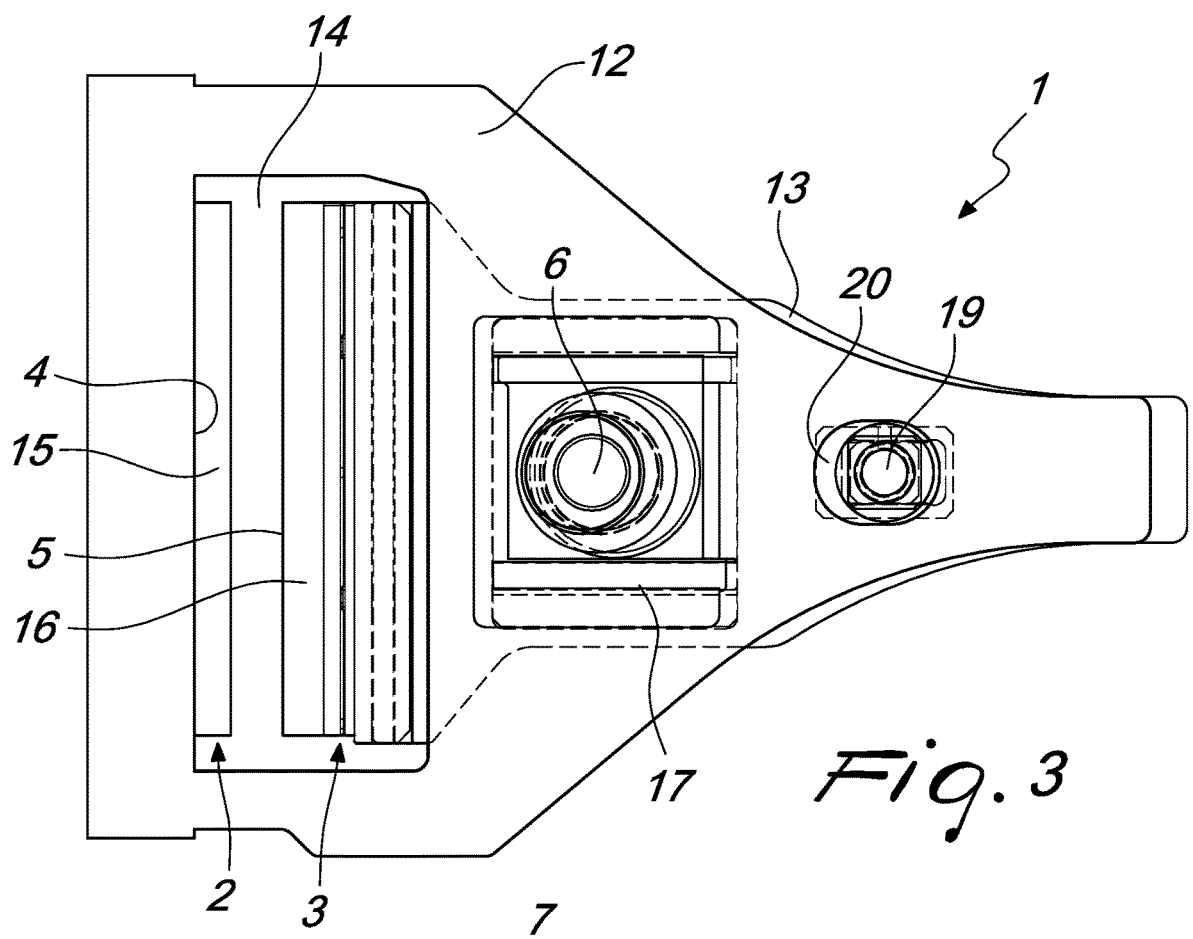
FIG. 3 is a schematic front view of the thermal bonding assembly of FIG. 1, showing in phantom lines both of the jaws in the "fully open" position.
Figure 4:
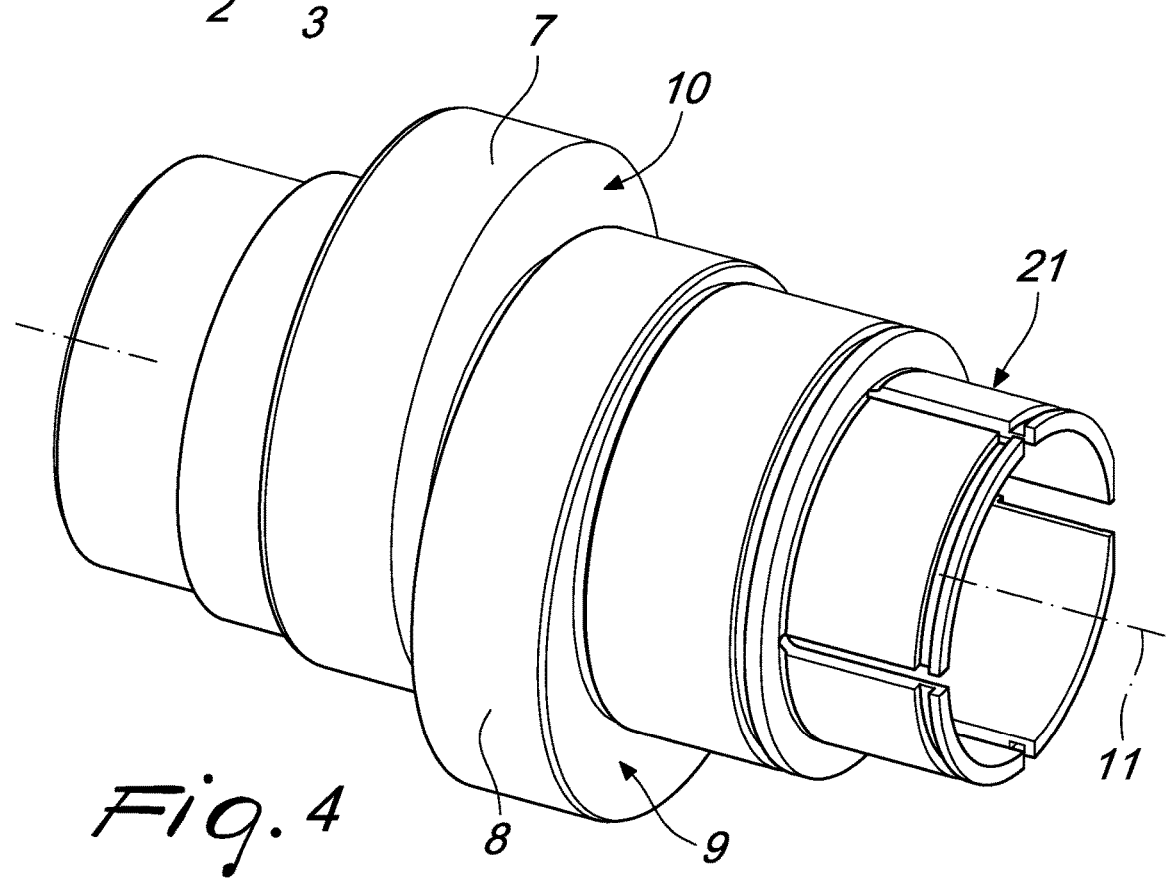
FIG. 4 is a perspective view of a sleeve with eccentric rings of the thermal bonding assembly of FIG. 1.
Figure 5:
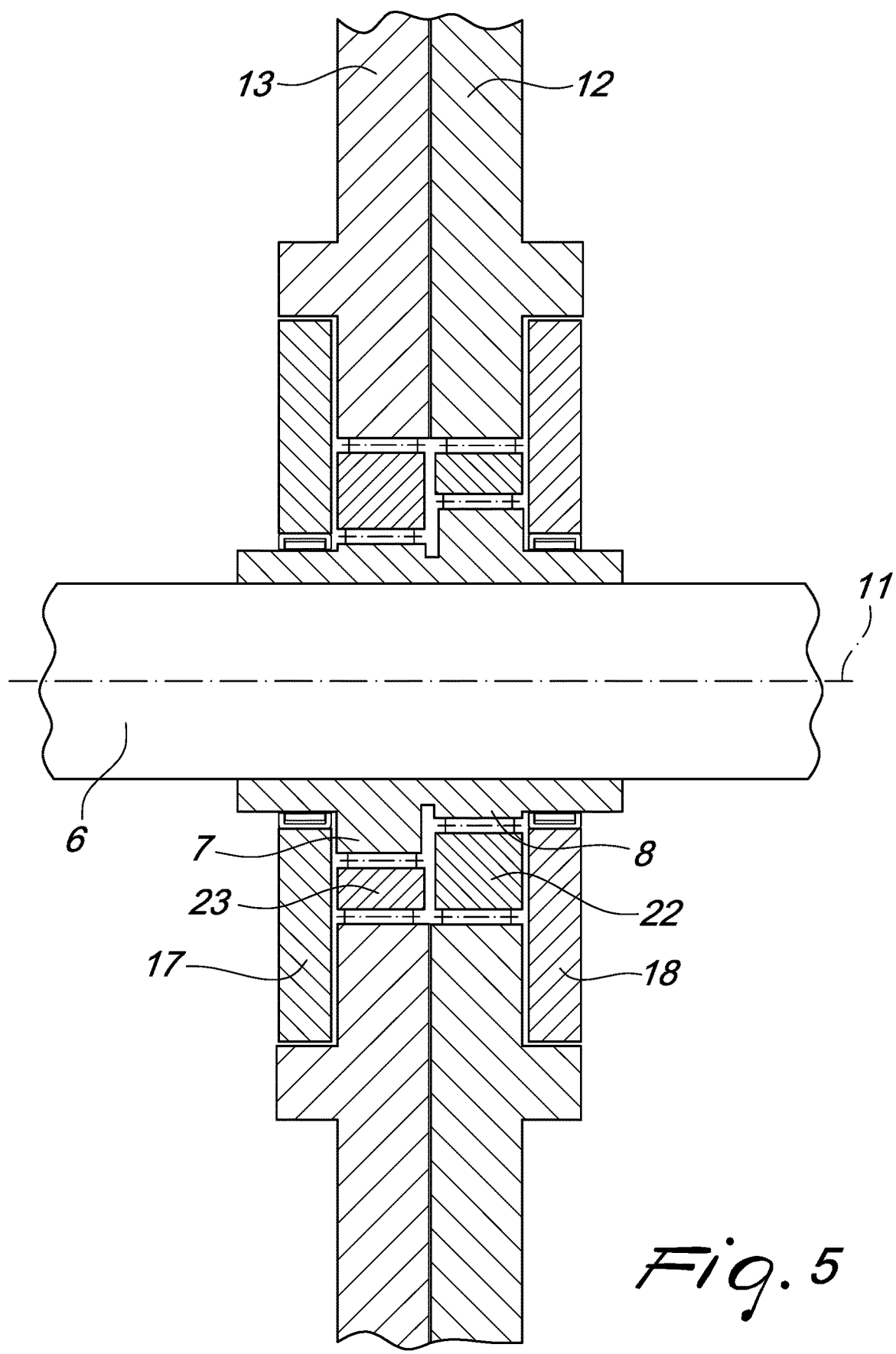
FIG. 5 is a transverse sectional view of a portion of the assembly of FIG. 1.
Figure 6:
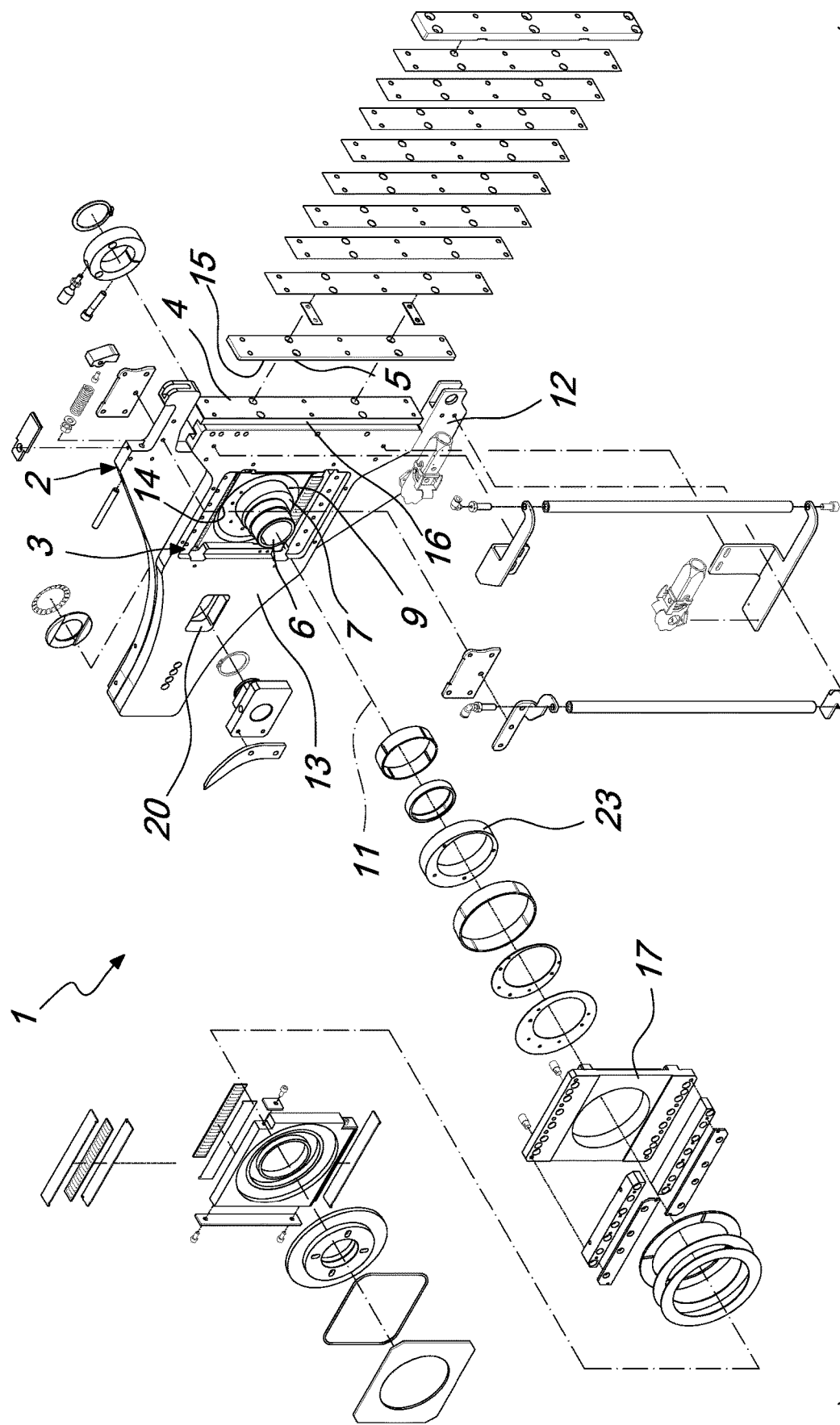
FIG. 6 is an exploded perspective view of the assembly of FIG. 1.

With particular reference to FIGS. 1-6, a thermal bonding assembly is designated generally by the reference numeral 1.

The thermal bonding assembly 1 according to the disclosure is particularly suitable for sheets made of polymeric material, since it allows easy coupling (by thermal bonding)

thereof even if there are multiple mutually opposite layers, folds with overlaps and/or additional and auxiliary elements made of polymeric materials, such as ribs of the type known as "open and close", are comprised.

The assembly 1 comprises at least one pair of jaws 2, 3 which can be moved mutually closer at least one of which 2, 3 is provided with a heater at its surface 4, 5 for abutment on a corresponding complementarily shaped surface 5, 4 of the other jaw 3, 2 of the pair.

The assembly 1 comprises a shaft 6 which can rotate by virtue of the action of a respective motor (not shown in the accompanying figures).

The rotatable shaft 6 comprises at least two side-by-side eccentric rings 7, 8, with an eccentric portion 9, 10 which protrudes more than the rotation axis 11 and is substantially mutually opposite.

Each jaw 2, 3 of the pair comprises a respective through hole for the accommodation of the shaft 6: the shaft 6 is accommodated in the hole of a respective jaw 2, 3 with the interposition of a rotatable disk 22, 23.

The hole of a first jaw 2 accommodates rotatably a first disk 22, which is provided with an eccentric hole whose shape and dimensions are complementary to those of a respective eccentric ring 7 which is integral with the shaft 6.

The hole of a second jaw 3 accommodates rotatably a second disk 23, which is provided with an eccentric hole whose shape and dimensions are complementary to those of a respective eccentric ring 8 that is integral with the shaft 6.

The rotation of the shaft 6 causes a mutual approach/spacing motion of the abutment surfaces 4, 5 of the jaws 2, 3 by virtue of the action of the eccentric rings 7, 8 in the corresponding disk 22, 23, which can rotate in the respective hole of a corresponding jaw 2, 3.

In practice, the operation of each jaw 2, 3 with respect to the shaft 6 can be likened to that of a rotary pusher crank system (i.e., a mechanism of the type known as "rod-and-crank").

The shaft 6 rotates and entrains integrally therewith the rings 7, 8: the eccentricity of the rings 7, 8 makes them fully comparable to a crank of the pusher crank system.

The disks 22, 23 accommodate the respective rings 7, 8 and can move with a translational motion together with the respective jaws 2, 3: the disks therefore behave like the rods of a pusher crank system.

The fact that a rotational (rotoidal) pair is interposed between the disks 22 and 23 and the respective hole of the corresponding jaw 2, 3 ensures that they can rotate freely with respect to the jaw 2, 3, providing the respective translational motion along the advancement/retraction path allowed and defined by the pusher crank system described earlier.

The jaws 2, 3 can therefore clamp between the respective abutment surfaces 4 and 5, with high clamping forces, layers of polymeric film that are interposed between them at a step of the rotation of the shaft 6 that causes a mutual approach thereof.

With particular reference to a constructive solution of unquestionable practical interest, each jaw 2, 3 can be conveniently constituted by a translating plate 12, 13 provided with a respective through opening 14, within which it is possible to accommodate the layers of polymeric film to be subjected to thermal bonding.

The superimposed layers of polymeric film (which optionally also comprise auxiliary polymeric elements, such as closure ribs, plugs, dosage devices, etc.) therefore pass through the opening 14 and can be clamped by the jaws 2, 3 (in particular they will be clamped between the respective abutment surfaces 4 and 5), which in addition to applying a compression force to them will be at a temperature suitable to ensure the corresponding thermal bonding.

Again with reference to this constructive solution, it is specified that each through opening 14 can conveniently comprise a respective band 15, 16 that protrudes from one of its edges.

The band 15, 16 is the one provided with the abutment surface 4, 5 on which the heater is installed.

In principle, each band 15, 16 can comprise a receptacle for the heater (which can be of any type, depending on the specific application); the adoption of bands 15, 16 made of ferromagnetic material and the installation on each plate 12, 13 of the respective jaw 2, 3 (proximate to the respective band 15, 16) of the circuits for generating high-frequency magnetic fields is not excluded: the induction of eddy currents in each band 15, 16 on the part of the circuit for generating high-frequency magnetic fields will cause, in this case, the heating of the abutment surface.

It is further pointed out that the protruding bands 15, 16 of respective translating plates 12, 13 of a same pair of jaws 2, 3 are mutually opposite, i.e., arranged on opposite edges of respective openings 14.

The bands 15, 16, therefore, are movable, integrally with the respective plate 12, 13, according to a translational motion for mutual approach and spacing.

With particular reference to a constructive solution of unquestionable interest in practice, the rotatable shaft 6 can accommodate validly a pair of guiding bushings 17, 18 (these are sliders provided with a rotoidal pair on the shaft 6 and a prismatic pair with respect to the jaws 2, 3).

The bushings 17, 18 are arranged externally with respect to the eccentric rings 7, 8 in a mutually symmetrical and opposite condition on the rotatable shaft 6. The bushings 17, 18 introduce constraints, i.e., they prevent mutual rotations and translations along paths that are different from the path for mutual approach/spacing of the jaws 2, 3.

The thermal bonding assembly 1 can further comprise advantageously a fixed alignment shaft 19: the absence of the shaft 19 would entail a non-isostatic condition of the assembly 1 and therefore, should the shaft 19 not be arranged in the configuration described here, it becomes necessary to introduce other constraining apparatuses.

The shaft 19 is accommodated within slots 20 of the jaws 2, 3 (therefore provided on an area of the respective plate 12, 13); said slots 20 are effectively arranged on the portion of the respective jaw 2, 3 that lies opposite the one that comprises the abutment surfaces 4, 5.

The slots 20 are elongated along the path of mutual sliding of the jaws 2, 3 in order to allow the advancement/retraction of a first jaw 2 and the retraction/advancement of a second jaw 3, i.e., a movement of the jaws 2, 3 along a same path but with opposite directions (which therefore allows the clamping of the layers of polymeric film to be subjected to thermal bonding).

It is further specified that the eccentric rings 7, 8 can be advantageously provided on a sleeve 19 that can be fitted and coupled rigidly on the rotatable shaft 6.

In this case, the sleeve 19 can comprise means for removable coupling to the rotatable shaft 6; the removal and/or the loosening of said coupling elements therefore allow the translation (which is substantially free but can be executed only following an external action applied directly to the sleeve 19) of the sleeve 19 along the rotatable shaft 6 in order to perform format changing operations.

In this manner, an operator can adjust manually the position of the sleeve 19 as a function of the particular format to be provided (after eliminating or loosening the coupling elements) or it is possible to provide an automatic system by means of which, as a consequence of an automatic loosening/removal of the coupling element, an actuator translates the sleeve 19 along the shaft 6 according to the dimensional parameters provided for the particular format to be provided.

It is specified that by virtue of the assembly 1 according to the disclosure, by means of the rotation of the shaft 6 on the part of a motor of extremely low power it is possible to apply a particularly intense clamping action to the layers of polymeric film, ensuring optimum quality of the thermal bonding seal that is then provided.

Furthermore, the shape of the entire assembly 1, which provides for components which are substantially symmetrical with respect to the shaft 6 and are moved in phase opposition, ensures the elimination of external effects of the clamping operation, with consequent optimum balancing of the thermal bonding assembly 1, which therefore can be lightweight and substantially independent of the frame of the machine in which it is installed.

Bearings to minimize friction are interposed between the disks 22, 23 and the respective plate 12, 13 and between the prismatic pairs (constituted by the guiding bushings 17, 18) and the respective plate 12, 13 and between the eccentric rings 7, 8 and the disks 22, 23.

Advantageously, the present disclosure solves the problems described earlier, proposing a thermal bonding assembly 1 that is capable of applying intense pressures despite being substantially modest in dimensions and mass.

Validly, the thermal bonding assembly 1 according to the disclosure therefore does not require specific supporting footings, which are heavy and bulky.

Conveniently, the thermal bonding assembly 1 according to the disclosure is capable of applying high uniform pressures to the entire area to be subjected to thermal bonding, regardless of the manner of application of the motion to the thermal bonding heads, the abutment surfaces 4 and 5, in mutual approach. Said pressure is in fact obtained by means of the rotation of the shaft 6 and does not necessarily require the adoption of pushers provided exclusively with a translational motion (as is instead necessary in thermal bonding assemblies of the known type).

Usefully, the thermal bonding assembly 1 according to the disclosure is relatively simple to provide in practice and has substantially modest costs: these characteristics render the assembly 1 an innovation of assured application.

The disclosure thus conceived is susceptible of numerous modifications and variations, all of which are within the scope of the appended claims; all the details may further be replaced with other technically equivalent elements.

The disclosures in Italian Patent Application No. 102016000112020 (UA2016A008006) from which this application claims priority are incorporated herein by reference.

The invention claimed is:

1. A thermal bonding assembly for sheets made of polymeric material, of the type comprising:
   at least one pair of jaws that can be moved mutually closer, at least one of the jaws includes a heater at an abutment surface configured for abutment against a corresponding complementary abutment surface of the other of the jaws;
   a shaft configured to rotate by the action of a respective motor, said shaft comprising at least two eccentric rings arranged side by side such that an eccentric portion that protrudes the most with respect to a rotation axis is substantially mutually opposite;
   each jaw of said pair comprises a through hole configured for accommodating said shaft, with the interposition of a rotatable disk, the hole of a first jaw accommodating rotatably a first disk, said first disk being provided with an eccentric hole the shape and dimensions of which are complementary to those of a respective eccentric ring integral with said shaft and the hole of a second jaw accommodating rotatably a second disk, said second disk having an eccentric hole the shape and dimensions of which are complementary to those of a respective eccentric ring integral with said shaft, the rotation of said shaft causing a mutual approach/spacing motion of said abutment surfaces of said jaws by the action of said eccentric rings in the corresponding disk configured to rotate in said hole of a respective jaw.

2. The thermal bonding assembly according to claim 1, wherein each jaw is constituted by a translating plate having a through opening configured to accommodate layers of polymeric film to be subjected to thermal bonding.

3. The thermal bonding assembly according to claim 2, wherein each through opening comprises a band that protrudes from an edge of said through opening, each of said bands comprising said abutment surface with said heater.

4. The thermal bonding assembly according to claim 3, wherein the protruding bands of respective translating plates of a same pair of jaws are arranged on opposite edges of respective openings, said bands being movable, integrally with the respective plate, according to a translational motion of mutual approach and spacing.

5. The thermal bonding assembly according to claim 4, wherein said translating plates comprise at least one pair of guiding bushings of the type of sliders provided with a rotoidal pair on the shaft and a prismatic pair with respect to the plates, for the coupling of the translating plates allowing a degree of freedom of mutual translation along the path of approach/spacing of the respective protruding bands within a predefined stroke.

6. The thermal bonding assembly according to claim 1, further comprising a fixed alignment shaft accommodated within slots of said jaws arranged on the portion that lies opposite the portion that comprises said abutment surfaces, said slots being elongated along the path of mutual sliding of said jaws to allow the advancement/retraction of a first jaw and the retraction/advancement of a second jaw such that said jaws move along the same path in opposite directions.

7. The thermal bonding assembly according to claim 1, wherein said at least two eccentric rings are provided on a sleeve which can be inserted and coupled rigidly on said rotatable shaft.

8. The thermal bonding assembly according to claim 7, wherein said sleeve comprises coupling elements configured for detachable coupling to said rotatable shaft, the removal and/or the loosening of said coupling elements allowing the translation of said sleeve along said rotatable shaft to perform format changing operations.

9. The thermal bonding assembly according to claim 5, wherein a plurality of bearings are interposed between said first and second disks and the respective translating plate, between said prismatic pairs, constituted by said guiding bushings, and the respective plate and between said eccentric rings and said first and second disks in order to minimize friction.

* * * * *